(No Model.)

C. H. CROSBY & H. W. COOK.
COVER FOR COOKING VESSELS.

No. 411,185. Patented Sept. 17, 1889.

WITNESSES
William F. Slocum
William N. Ambler

INVENTORS
Charles H. Crosby.
Horace W. Cook.

UNITED STATES PATENT OFFICE.

CHARLES HOWARD CROSBY AND HORACE WEBSTER COOK, OF BOSTON, MASSACHUSETTS.

COVER FOR COOKING-VESSELS.

SPECIFICATION forming part of Letters Patent No. 411,185, dated September 17, 1889.

Application filed January 9, 1889. Serial No. 295,877. (No model.)

*To all whom it may concern:*

Be it known that we, CHARLES HOWARD CROSBY and HORACE WEBSTER COOK, citizens of the United States, and residents of the city of Boston, county of Suffolk, and State of Massachusetts, have jointly invented a new and useful Improvement in Covers for Cooking-Vessels, of which the following is a specification.

Our invention is an improvement in that class of cooking-vessels which are provided with receptacles for substances capable of absorbing and deodorizing unpleasant odors arising from certain kinds of food while being cooked.

It is also an improvement upon such vessels as have covers constructed with chambers for receiving such odors, whence they are conducted through a suitable connecting-tube down into the fire pot or flue.

Our improved cover has a central opening surrounded by a fixed flange or collar, forming a box whose bottom is a grating adapted for supporting pieces of charcoal—the most perfect absorbent of the disagreeable odors of food such as cabbage, onions, &c., while cooking. A foraminous cap or lid is applied to this box and made detachable to allow convenient removal of the spent and substitution of fresh charcoal when required. The odors from the cooking food enter such box, and, coming in contact with the charcoal therein, are thus deodorized, and then escape upward through the openings in the cap or lid of the box.

Figure 1:
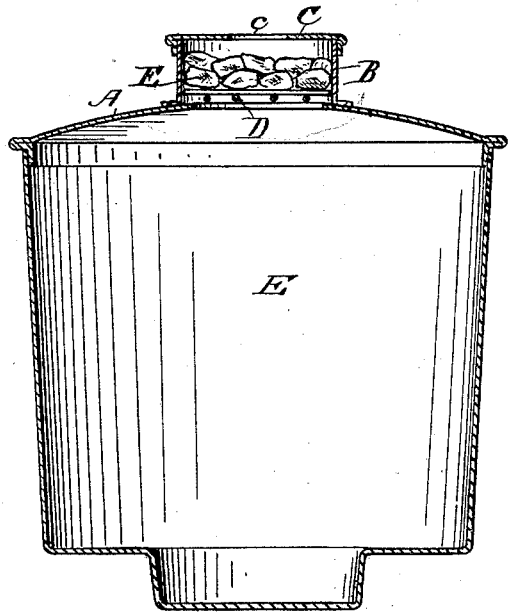
Figure 2:
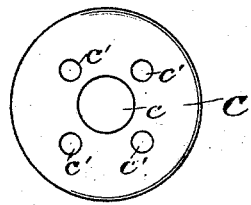
Figure 3:
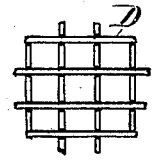

In the accompanying drawings, Figure 1 is a vertical central section of the upper portion of a cooking-vessel provided with a cover constructed according to our invention. Fig. 2 is a plan view of the foraminous lid of the charcoal-box applied to the aforesaid cover. Fig. 3 is a plan view of the grating upon which the charcoal is supported within the box.

A indicates the detachable cover of the cooking-vessel F. It has a central opening, which, in practice, is usually made about four inches in diameter. Around this opening a vertical annular flange B is soldered to the cover, and constitutes a box or receptacle for the absorbent material—to wit, pieces of charcoal E. The latter are supported upon a wire grating D, which rests on the cover A, and thus serves as an open-work bottom for aforesaid box. The latter has a detachable cap or lid C, which is provided with a number of openings c. By this construction and arrangement of parts the odor-laden steam rising from food being cooked in the vessel F finds a free passage up through the grating, and, being deodorized and disinfected by contact with the charcoal E, escapes in its purified condition through the openings c in cap C directly into the apartment.

What we claim is—

The combination, with the cooking-vessel cover A, having a central opening, and a vertical annular flange B, secured around the latter and forming part of the box hereinbefore specified, of the charcoal-supporting grating D, placed within said box, and the detachable cap C, applied to the latter and having openings c for escape of deodorized fumes, as shown and described.

CHARLES HOWARD CROSBY.
HORACE WEBSTER COOK.

Witnesses:
WILLIAM F. SLOCUM,
WILLIAM N. AMBLER.